United States Patent

[11] 3,619,588

| [72] | Inventor | Keith W. Chambers<br>Pinawa, Manitoba, Canada |
|---|---|---|
| [21] | Appl. No. | 877,752 |
| [22] | Filed | Nov. 18, 1969 |
| [45] | Patented | Nov. 9, 1971 |
| [73] | Assignee | Atomic Energy of Canada Limited<br>Ottawa, Ontario, Canada |

[54] HIGHLY COLLIMATED LIGHT BEAMS
10 Claims, 1 Drawing Fig.

[52] U.S. Cl. .................................................. 240/1 R,
331/94.5, 350/294
[51] Int. Cl. ..................................................... F21k 2/00
[50] Field of Search ........................................... 240/1;
331/94.5; 350/294

[56] References Cited
UNITED STATES PATENTS

| 3,242,806 | 3/1966 | Hine ............................ | 350/294 |
| 3,433,555 | 3/1969 | Tomlinson .................... | 331/94.5 X |

FOREIGN PATENTS

| 32,974 | 8/1921 | Norway ........................ | 350/294 |

*Primary Examiner*—Louis R. Prince
*Assistant Examiner*—Frederick Shoon
*Attorney*—Cushman, Darby & Cushman ABSTRACT: This application discloses a light source consisting of a gas-filled pressure vessel to which light from a laser is admitted and focused to a point. Light emitted by the gas at the focal point is directed by a mirror system to an output pupil to provide a highly collimated light beam.

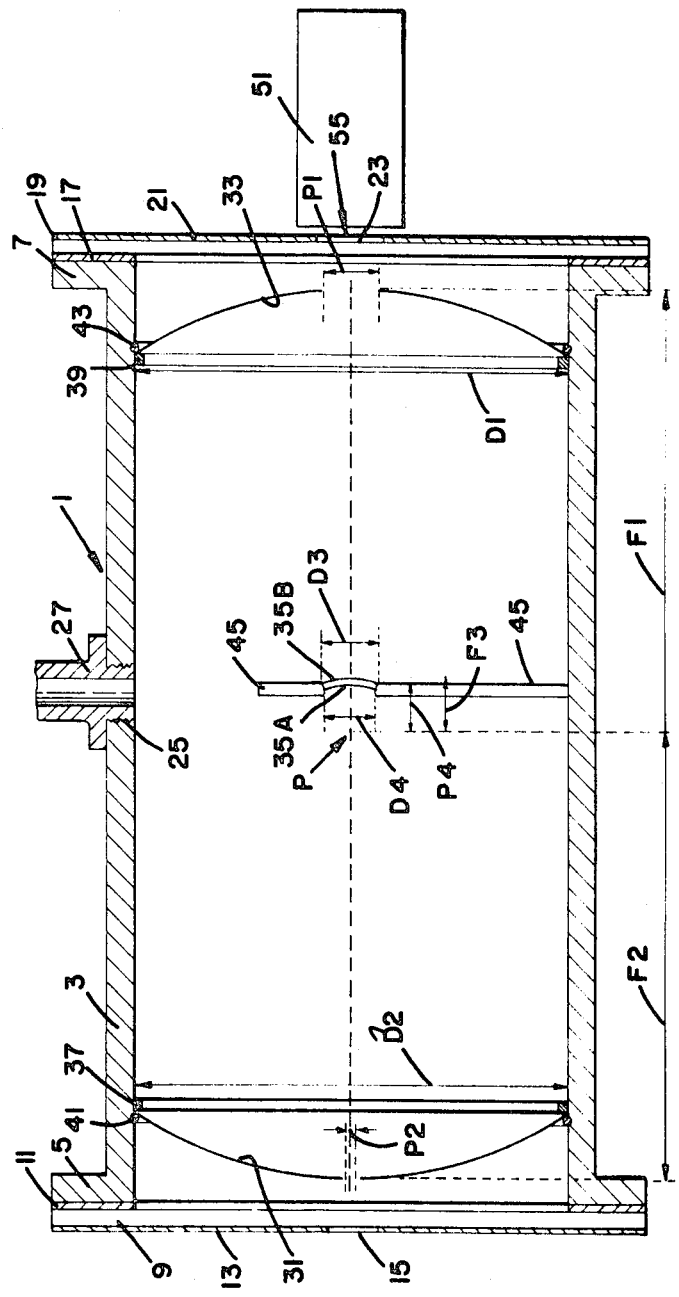

HIGHLY COLLIMATED LIGHT BEAMS

This invention relates to the production of highly collimated light beams.

Such a highly collimated light beam finds many uses in physics, one such use being as a spectroscopic flash in certain photolysis experiments. An intense light flash can be produced by a laser beam focused in a gas.

According to the present invention, a light source adapted to produce a highly collimated light beam comprises a pressure vessel; a gaseous filling in said pressure vessel of a gas able to produce by breakdown light of the required spectral content; an entrance pupil through which light from a laser can enter the said pressure vessel; an output pupil through which light can pass from the said pressure vessel; a first optical system disposed within the pressure vessel and arranged to focus light entering the said entrance pupil inside the gas in the pressure vessel to a focal point; and a second optical system disposed within the pressure vessel and arranged to direct light passing from the said focal point out of the vessel through the said output pupil.

The invention will now be described, by way of example, with reference to the accompanying drawing, which is a sectional side elevation of a high-pressure gas cell and shows a laser arranged to energize that cell.

The high-pressure gas cell 1 comprises a cylindrical body 3 formed at its two ends with flanges 5 and 7 respectively. The inside of this body has a matte black finish, such as is used in optical equipment. Clamped to flange 5, by bolts which are not shown, is a glass window 9, a sealing washer 11 lying between the window and the flange. Fastened to the outside of the window 9, by a suitable adhesive, is an opaque screen 13 formed with a central aperture 15. Similarly, clamped to flange 7 is a glass window 17 provided with a sealing washer 19 and an opaque screen 21 formed with a central aperture 23. The body 3 is formed with a port 25 into which is screwed a nipple 27 connected to orthodox air-removal and gas-insertion apparatus, by which the gas cell can first be evacuated and then can be filled with any desired gas at a desired operating pressure.

Mounted inside the cell 1 are three mirror systems, namely an inwardly directed concave parabolic mirror 31 positioned adjacent flange 5, and inwardly directed concave parabolic mirror 33 positioned adjacent flange 7, both of these mirrors being of the same diameter and practically filling the cross section of body 3, and a much smaller double-sided parabolic-mirror system having a concave mirror 35A directed towards mirror 33, the mirror system being located on the central axis of the body 3 and positioned somewhat further from the mirror 31 than from the mirror 33. Mirrors 31 and 33 are held in place respectively against fixed rings 37 and 39 by circlips 41 and 43, while mirror system 35A, 35B is located relative to the body and the other mirrors by a thin but rigid three armed spider 45. Thus its arms can have a thickness of 0.5 cm. and a width of 1.00 cm.

Indicated in the drawing are: a focal point P; a central aperture P1 in mirror 33 forming an entrance pupil; a central aperture P2 in mirror 31 forming an output pupil; the diameters D1, D2, D3 and D4 respectively of mirrors 31, 33, 35B and 35A; the focal lengths F1 of mirror 33, F2 of mirror 31, F3 of mirror 35B and F4 of mirror 35A.

The mirrors used in the preferred embodiment are front aluminized parabolic mirrors of quality similar to that found in astronomical image forming systems. They have the smallest attainable ratio of diameter to focal length. The diameters M1 and M2 should not exceed 20 cm. The front surface coatings should give high reflectivity in the wavelength ratio 200 to 800 nanometer (1 nanometer equals $10^{19}$ meter). The following relationships also exist:

a. $D1/F1 = D2/F2 = D3/F3 = D4/F4$
b. $F1 = F2$
c. $(F3-F4)$ is as small as practicable
d. $F4 = F2/10 = F1/10$
e. $P1 = D3$
f. $P2 = D4/10$ Also shown in the drawing is a laser unit 51 the collimated beam of light from which has a diameter approximately equal to diameter D3. In order to provide a laser beam of the same diameter as the entrance pupil P1, the laser unit 5 includes a laser producing a narrow beam together with a beam expanding telescope to produce a beam of the desired width. Such telescopes are provided as standard items by manufacturers of lasers and simply attach to the output head of the laser. The part of the glass window 21 which underlies the aperture 23 is formed as a selective mirror 55 in known manner, which selective mirror transmits incoming light from the laser at most frequencies but reflects light at the frequency which originates within the gas cell.

The arrangement of mirrors shown constitutes two astronomical telescope systems, one Cassegrain and consisting of mirrors 31 and 35A. and aperture P2, and the other Gregorian and consisting of mirrors 33 and 35B and aperture P1. All the parabolic reflecting surfaces have a common focal point (P) and the same $f$-number.

The high-pressure gas cell is prepared for use by evacuation and by filling with the desired gas under the appropriate pressure. Thus, for example, it can be filled with xenon gas to a pressure of 3 to 5 atmospheres to give a distribution of spectral radiance similar to that of a high-pressure xenon arc lamp. Xenon lamps emit strong medium- and long-wave ultraviolet radiation with a continuous spectrum and have several radiation maxima in the short-wave infrared range, i.e., between 8,000 and 10,000 A. For any particular arrangement (gas), the cell could be energized by a ruby laser for pulsed output or a high-power continuous-wave laser (e.g., 100 W $CO_2$ gas laser) for continuous output. The laser 51 is then energized, and the collimated beam of light from the laser enters the cell through the selective mirror 55 and the entrance pupil at P1. After reflection at the surfaces of mirrors 35B, 33 and 31, the laser beam is brought to a focus at point P; the "residual" laser beam passes out of the device through the exit pupil at P2, after an appropriate number of reflections at mirrors 31 and 35A.

Light rays emitted at the point P due to breakdown of the gaseous medium by the focused laser beam, and which undergo their first reflection at mirror 35A, pass out of the system via output pupil P2 as a narrow, collimated beam after an appropriate number of reflections at mirrors 31 and 35A.

Light rays emitted at the point P and which are reflected first at mirror 31 will pass out of the system via the entrance pupil P1 but will be returned by the selective mirror 55, and ultimately follow the same path as those rays emitted at point P which are first reflected at mirror 35A.

Emitted rays whose wavelength is equal to that of the laser beam will be lost through selective mirror 55; intensity losses at this wavelength will, however, be made up by the residual laser beam.

The useful output from the cell 1 is thus emitted from the output pupil P2. This light output corresponds, essentially, to the emission spectrum of the gaseous medium used, and is in the form of an intense, narrow and highly collimated beam.

I claim:

1. A light source adapted to produce a highly collimated light beam having a spectral content different from that of light from a laser light source, and comprising:
   a. a pressure vessel;
   b. a gaseous filling in said pressure vessel of a gas able to produce by breakdown light of the required spectral content;
   c. an entrance pupil through which light from said laser light source can enter the said pressure vessel;
   d. an output pupil through which light can pass from the said pressure vessel;
   e. a first mirror system disposed within the pressure vessel and arranged to focus light entering the said entrance pupil inside the gas in the pressure vessel to a focal point; and f. a second mirror system disposed within the pressure vessel and arranged to direct light produced by breakdown of the gas passing from the said focal point out of the vessel through the said output pupil as a highly collimated light beam.

2. A light source according to claim 1, and in which the first mirror system comprises:
   a. a first circular concave paraboloidal mirror;
   b. a first central aperture in that mirror;
   c. a circular convex paraboloidal mirror facing the concave mirror and having a diameter much smaller than that of the convex mirror;
   d. a second circular concave paraboloidal mirror facing the said first circular concave mirror;
   e. a second central aperture, in the said second concave mirror; the focal points of the first and second concave mirrors being coincident with the focal point of the convex mirror, and the light entering the space between the first concave mirror and the convex mirror through the said first aperture being directed by the second concave mirror to the said focal point.

3. A light source according to claim 2, and in which the diameter of the convex mirror is substantially equal to the diameter of the said central aperture.

4. A light source according to claim 2, and in which each mirror is a front-surfaced mirror.

5. A light source according to claim 1, and in which the second mirror system comprises:
   a. said second concave mirror;
   b. said second central aperture in that mirror;
   c. a third circular concave paraboloidal mirror facing said second concave mirror and having a diameter much smaller than that of said second concave mirror;
   the focal points of said second and said third concave mirrors being coincident, and light originating at the said focal point passing out of the space between the mirrors by reflection first from the third concave mirror and second by multiple reflection between the second and third concave mirrors.

6. A light source according to claim 5, and in which each mirror is a front-surfaced mirror.

7. A light source according to claim 1, and in which:
   a. the first mirror system comprises:
      i. a first circular concave paraboloidal mirror;
      ii. a first central aperture in that mirror;
      iii. a circular convex paraboloidal mirror facing the concave mirror and having a diameter substantially equal to the diameter of the said first central aperture;
      iv. a second circular concave paraboloidal mirror facing the said first circular concave mirror;
      v. a second central aperture, in the said second concave mirror;
   b. the second mirror system comprises:
      i. said second concave mirror;
      ii. said second central aperture in that mirror;
      iii. a third circular concave paraboloidal mirror facing said second concave mirror and having a diameter much smaller than that of said second concave mirror;
   c. the focal points of said second and third concave mirrors being coincident;
   d. light entering through the entrance pupil passing by reflection at the convex mirror and the first and second concave mirrors to the said focal point;
   e. light originating at the said focal point passing alternatively:
      i. after a first reflection at the third concave mirror by multiple reflections between the third concave mirror and the second concave mirror out through the second central aperture to a point of use;
      ii. after a first reflection at the second concave mirror, by reflection at said first concave mirror and said convex mirror but through said first central aperture.

8. A light source according to claim 7, and in which each mirror is a front-surfaced mirror.

9. A light source according to claim 7, and in which:
   a. selective mirror is provided at the entrance pupil;
   b. this selective mirror permits entry into the pressure vessel of light having the frequency of the laser;
   c. this selective mirror returns into the pressure vessel light originating at the said focal point which has a frequency markedly different from that of the said laser light;
   d. such returned light is caused to return via said convex mirror, said first and second concave mirrors to the focal point and to pass thence to said third concave mirror for multiple reflection towards the output pupil.

10. A light source according to claim 9, and in which each mirror is a front-surfaced mirror.

* * * * *